(12) United States Patent
Morrow

(10) Patent No.: US 8,262,548 B1
(45) Date of Patent: Sep. 11, 2012

(54) AIR MANAGEMENT FOR ENHANCING PNEUMATIC REBOUND TRAINING

(75) Inventor: George Steven Morrow, Green Mountain Falls, CO (US)

(73) Assignee: Plyo Systems, LLC, Colorado Springs, CO (US)

( * ) Notice: Subject to any disclaimer, the term of this patent is extended or adjusted under 35 U.S.C. 154(b) by 1176 days.

(21) Appl. No.: 11/604,087

(22) Filed: Nov. 25, 2006

Related U.S. Application Data

(60) Provisional application No. 60/739,674, filed on Nov. 25, 2005.

(51) Int. Cl.
*A63B 21/008* (2006.01)
*A63B 25/08* (2006.01)

(52) U.S. Cl. ............................ 482/112; 482/77; 482/111

(58) Field of Classification Search ............. 482/33, 482/15, 66, 77, 111, 112, 143, 113, 145
See application file for complete search history.

(56) References Cited

U.S. PATENT DOCUMENTS

| | | | | |
|---|---|---|---|---|
| 3,966,097 A | * | 6/1976 | Crown et al. | 222/402.2 |
| 4,057,173 A | * | 11/1977 | Tal | 222/20 |
| 4,124,202 A | | 11/1978 | Hatakeyama | |
| 4,550,749 A | * | 11/1985 | Krikorian | 137/843 |
| 4,632,371 A | | 12/1986 | Wirges et al. | |
| 4,870,763 A | * | 10/1989 | Campbell | 38/77.7 |
| 5,087,037 A | * | 2/1992 | Morrow | 482/33 |
| 5,628,496 A | | 5/1997 | Chamberlin | |
| 5,810,125 A | | 9/1998 | Gezari | |
| 5,887,857 A | | 3/1999 | Perrin | |
| 5,915,674 A | | 6/1999 | Wolf et al. | |
| 5,921,899 A | | 7/1999 | Rose | |
| 6,267,360 B1 | | 7/2001 | Matsuhashi | |
| 6,446,943 B1 | | 9/2002 | Holden | |
| 6,468,190 B1 | | 10/2002 | Fazio et al. | |
| 6,533,706 B2 | | 3/2003 | Morrow | |
| 7,011,608 B2 | * | 3/2006 | Spencer | 482/77 |

OTHER PUBLICATIONS

Metering Valve (N Series). Jacksonville, Alabama: Parker Hannifin Corporation, 2002.*

* cited by examiner

*Primary Examiner* — LoAn H. Thanh
*Assistant Examiner* — Sandhara Ganesan

(57) ABSTRACT

An air management system that allows safe and convenient forms of interval training exercise to be performed on pneumatically elevating rebound exercise equipment. The system includes at least one air intake valve and bleed valve. By providing repeatable degrees of difficulty for both air intake and air release from the extendable air springs employed for the exercise, competitive athletes and their coaches can design, employ, repeat, and compare individualized medium- or high-intensity interval protocols for optimal cardiovascular training programs.

5 Claims, 1 Drawing Sheet

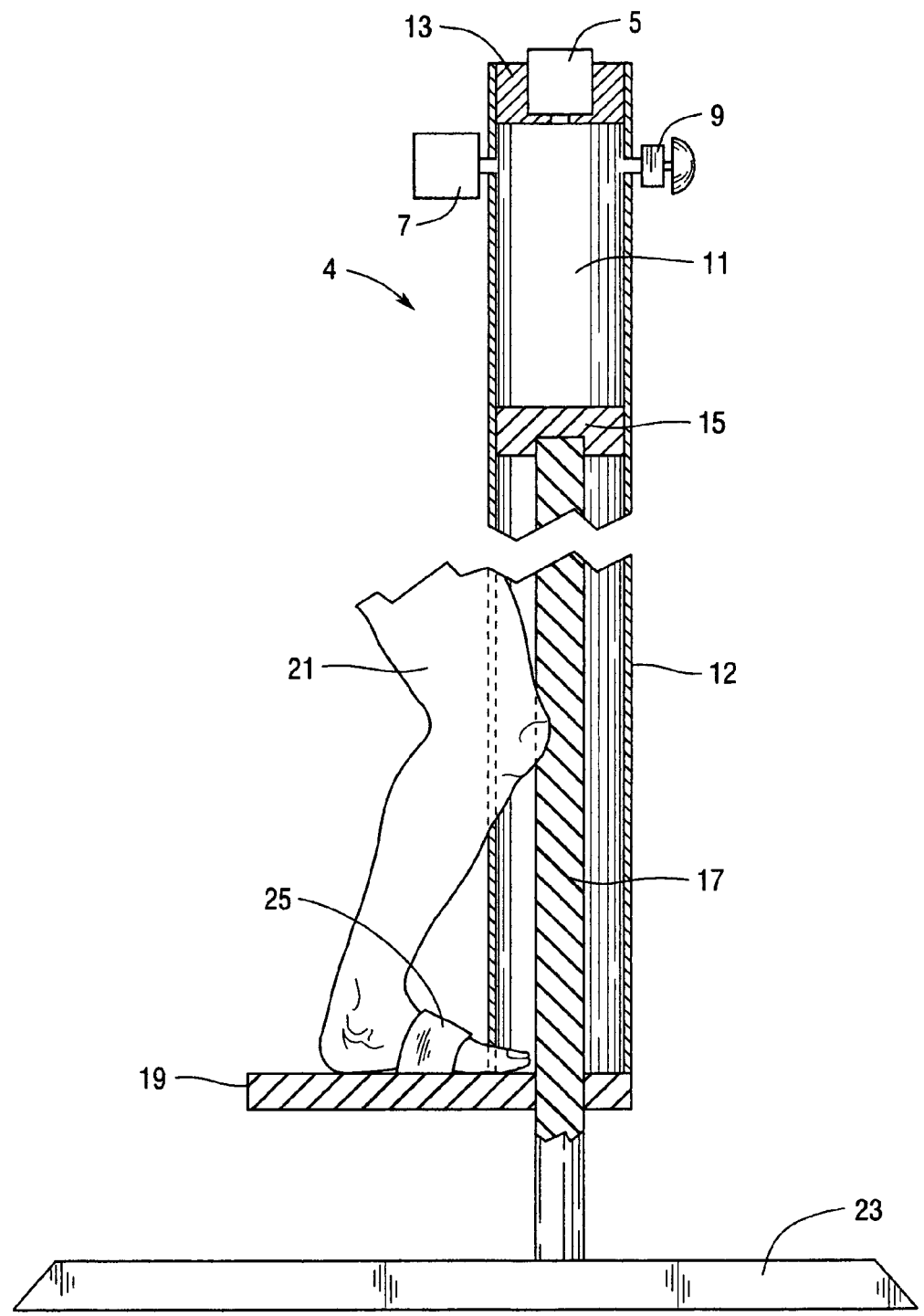

AIR MANAGEMENT FOR ENHANCING PNEUMATIC REBOUND TRAINING

CROSS-REFERENCE TO RELATED APPLICATIONS

This application relates to stationary versions of the pneumatic rebound exercise devices described in the present inventor's U.S. Pat. No. 5,087,037 granted Feb. 11, 1992, and is intended to incorporate that patent, as well as Provisional Patent Application No. 60/739,674 filed Nov. 25, 2005, the priority date of which is claimed by reference thereto.

STATEMENT REGARDING FEDERALLY SPONSORED RESEARCH OR DEVELOPMENT (Not applicable)

REFERENCE TO SEQUENTIAL LISTING, A TABLE, OR A COMPUTER PROGRAM LISTING APPENDIX SUBMITTED ON A COMPACT DISC (Not applicable)

BACKGROUND OF THE INVENTION

1) Field of the Invention

This application relates to stationary versions of pneumatic rebound exercise devices.

2) Description of the Related Art

The closest prior art known to me are the following U.S. patents which were deemed pertinent: U.S. Pat. Nos. 4,124,202, 4,632,371, 5,628,496, 5,810,125, 5,887,857, 5,915,674, 5,921,899, 6,267,360, 6,446,943, 6,468,190, and 7,011,608. Also, patents for various types of valves in common use [Note: these patents were chosen as the oldest (cir. 1976) from the lists of patents resulting from "Title" searches of the specified valve types on the PTO data base.] are listed as follows, and are intended to be incorporated herein by reference: U.S. Pat. No. 3,966,097 describes a "fluid metering valve"; U.S. Pat. No. 3,985,837 describes a needle valve that is vented for use in a carburetor; U.S. Pat. No. 3,960,361 describes a solenoid valve of that time; U.S. Pat. Nos. 4,083,382, 4,231,544, and 4,195,551 all describe valves with different types of detents; U.S. Pat. No. 4,092,505 describes an early valve "timer arrangement"; and U.S. Pat. No. 4,193,064 describes a "multiple pulse timer"; U.S. Pat. No. 4,112,959 describes one of several hits for patents titled "adjustable check valve"; and both U.S. Pat. Nos. 4,955,507 and 4,753,770 contain a "motorized control (fluid metering) valve" in their abstracts.

BRIEF SUMMARY OF THE INVENTION

The present invention pertains to a system of enhancing aerobic and anaerobic conditioning for athletes using pneumatically elevating rebound machines. This system provides repeatable levels of exercise difficulty for athletes, coaches and trainers that can be used as a gauge of progress in cardiovascular fitness as well as a motivating factor for the athlete. The system is particularly well suited to High-Intensity Interval Training (HIIT), which is generally accepted as the most effective method of cardiovascular training for many high-energy sports.

The present inventor's above-mentioned patent (U.S. Pat. No. 5,087,037) describes versions of exercise machines that take advantage of air cylinders used as compression springs to achieve an easily adjustable low-impact vertical rebounding (bouncing) exercise.

The most novel feature described in the referenced patent by this inventor, allows the automatic upward extension, or lengthening of the air spring/cylinders(s) whenever the movable part of the apparatus is drawn far enough upward by the energetic bounding efforts of the exerciser. This motion creates a partial vacuum that draws more air into the spring/cylinders through check valves, effectively lengthening the air springs. It was found early on in the development of that invention that the check valves used needed to have the lowest "cracking pressure" available, which is the pressure at which the valve opens, allowing, in this case, air to be drawn into the cylinders. This 'pumping-in' of air is what allows the exerciser to bounce higher, which explains the need for a very low cracking pressure; otherwise, very few people would be able to operate the equipment as designed. When it is desired to descend, a valve is opened that bleeds air from the spring/cylinders. This "descent valve" is either a manual push-button bleeder valve or a common ball valve in all the early prototypes, as well as many of the later versions.

In the years that followed the above-mentioned original patent application process, many improvements were made in the machine design, most of which were focused on reducing friction in the air-spring/cylinders so that the bounding motion could be as free and easy as possible for the user. Much of the resulting reduction of friction was accomplished by reducing the suggested interference, or tightness between the bore of the cylinder and the U-cup piston seal. Although the friction was reduced considerably in this way, we found that there was a fine line between low friction and air leakage past the seal, and we had already seen that any leakage of air from the system was not appreciated by the users, as the air thus leaked had to be replaced by energetic efforts. Most of this early development was done by trial and error, as there were no precedents to be found for push-stroke air cylinders used in this way as low-friction air springs.

The high side-loads on the bearing surfaces required oversize, low friction bearings, even after the next notable improvement: that of joining two of the above-described spring/cylinders by rigidly attaching a footrest platform and handlebar between them. Compared with the earlier, single-cylinder designs shown in the early patent above-referenced, that change also greatly reduced the friction caused by side-loading of the sliding surfaces. This improvement not only increased the life expectancy of the machines by several times, but also made the bounding exercise easier and more enjoyable for the average exerciser, and for longer periods of use.

During those early years of developing what we were calling Recreational Exercise Machines, concerted efforts were being made to license the original patent to the established manufacturers in the exercise equipment industry. Time and again we were turned away because the effectiveness of this new type of exercise equipment was unproven. We were being told by the more candid of the industry's manufacturing CEO's that such a novel exercise was interesting, but that it needed the acceptance and use by professional athletes and coaches. In other words, none of the CEO's was willing to pioneer a new genre of equipment until a definite market for it was demonstrated. A few of them stated that it was hard to conceive of a new type of exercise machine that could compete with the three main types of cardiovascular training equipment: treadmills, steppers, and stationary bikes.

In our subsequent research into the popularity and usability of these three popular competing exercise systems, it was noted that all three had mechanisms to vary the degree of exercise exertion. For instance, bikes and steppers (including "ellipticals" and "cross-trainers") use some form of braking, while treadmills mainly vary their speed and angle of incline. In this way, all three types of devices are able to accommodate a wide range of users' fitness levels. At the time, we did not see a practical method of producing repeatable levels of difficulty on our equipment. Adding friction braking was an obvious possibility, but would reduce the range of motion, the ease of ascending, and thus overall usability and enjoyment factors. Speed, elevation, and acceleration all affect each other on our equipment, and vary with each individual stroke and the temporary output whims of the user, so would also be impractical for measuring difficulty levels.

In the course of subsequent testing and experimenting with a prototype of this lower-friction design, it was noticed by this inventor that a more difficult exercise could be obtained by performing more than one ascent/descent cycle in succession. This is because ascending on the machine is so much more physically demanding than bouncing at the same elevation of the equipment. Since the speed at which ascents are performed also varies with the efforts of the user, any desired degree of difficulty is possible; however, the degree of difficulty so achieved could not be repeated with any precision. Knowing that this ascent phase of the exercise can be timed, different methods of controlling the check valve were, and are being considered. One such method is to vary the "cracking pressure" of the check valve. We have also realized that the flow capacity of the check valve (intake) flow path could be varied, and that a lower intake flow capacity would have a similar effect as a higher cracking pressure would, i.e., a more difficult ascent exercise. Though these advances were promising, the mental search continued for a more usable, easily repeatable exercise comparison system. It was not long after this time that the realization came that, instead of opening the descent valve to come down after each ascent, a bleed valve could be opened to some partial degree for an entire exercise interval of any desired length. This is how the realization came about that we could also control exercise difficulty by intentionally causing air leakage from the system, which is now the preferred method shown in this present invention.

As mentioned above, we had up this point gotten only negative feedback from users regarding any air leaks. This is understandable because any loss of air from the system immediately requires a higher level of exertion in order to pump in as much air through the check valves as is being lost through leakage; otherwise, the device will soon bottom out on the floor. Now I saw how the users could be timed to see how long they could 'stay up'—keep from bottoming out—at a particular amount of bleed valve opening. I could also see how these capabilities could be instrumental for gaining the acceptance among professional coaches and athletes that was needed in order to establish the "definite market" referred to above by the corporate CEO's. It was also evident that repeatable degrees of valve opening would be necessary, not only for the effects of the exercise to be measured and studied, but also as gauging benchmarks for the athletes and coaches using the equipment.

In order to allow a modicum of precision in the repeatability of such experimenting, marks were inscribed on the body of a simple ball valve which was installed as the descent valve on the prototype machine being tested. These marks naturally corresponded with various degrees of opening of the valve when the handle was lined up with them. It was found that a fair degree of precision was obtained by this method, depending on the care taken to precisely line up the edge of the valve's handle with the marks. More sophisticated and exacting methods of metering the release of air have since been installed and tested, and are described below. Additionally, it was soon noticed that varying the ease of air intake also had a direct effect on the exercise difficulty. This could be accomplished either by varying the cracking pressure of the check valves used, or the flow capacity of same.

The main object of the present invention is to provide professional and commercial viability for pneumatically elevating rebound exercise devices. In order to accomplish this objective, it provides:

A wide range of repeatable levels of difficulty for cardiovascular exercise,

Several options for achieving different exercise difficulty levels, and

A capability for timed interval training for improving cardiovascular fitness, producing Comparative benchmarks of cardiovascular capacity for the athletes and their coaches.

Motivation for athletes to improve and exceed previous efforts on the equipment.

Encouragement for exercise competition between athletes.

Virtually unlimited degrees of exertion, varying from gentle aerobic exercise levels for the casual exerciser, through anaerobic High-Intensity Interval Training (HIIT) levels for competitive athletes, Mitigated impact levels for high intensity plyometric (jumping) exercise, and Increased Range-Of-Motion (ROM) control.

Further objects and advantages may become evident from a consideration of the drawing and ensuing descriptions.

BRIEF DESCRIPTION OF THE DRAWING

FIG. 1 shows a simplified schematic view of the invention. The FIGURE has the reference numerals as follows:
4 extendable air spring (push-stroke air cylinder)
5 adjustable intake check valve
7 adjustable bleed valve
9 push-type "bleeder" descent valve
11 air compression chamber
12 cylinder barrel
13 cylinder head
15 piston
17 piston rod
19 footrest platform
23 base/stand
25 foot strap

DETAILED DESCRIPTION OF THE INVENTION

The FIGURE shows a schematic view of a basic form of the invention. An extendable air spring 4 is shown connected to a base/stand 23 by way of a piston rod 17 which is connected to piston 15. The piston sealingly slides inside cylinder barrel 12, which is sealingly closed off at the top by a cylinder head 13. An extendable air compression chamber 11 is thus defined and confined inside the cylinder barrel 12 and between the piston 15 and cylinder head 13. A foot strap 25 is connected to a footrest platform 19 which rigidly connects to the bottom of the cylinder barrel 12 and is shown being acted upon by a leg of an exercising user. The FIGURE also shows three different air valves opening into the air compression chamber 11: adjustable intake check valve 5, adjustable bleed valve 7 (a needle-type metering valve in the preferred embodiment), and a normally closed, push-type descent valve 9.

The basic operation is as follows: In the FIGURE, a leg of an exercising user is shown as providing the motive force that is producing a bouncing motion of the air spring 4 and the user by its downward exertions against footrest platform 19. The moving parts move as a unit, and include all the parts shown in the drawing except for the interconnected base/stand 23, piston rod 17, and piston 15. It may be seen that the rebound motion is produced by the varying degrees of air pressure in the air compression chamber 11. Thus, a harder, swifter downward exertion by the user's leg(s) produces a faster, higher bounce. When the user desires to "ascend" by extending the air spring in order to bounce at a higher elevation, he/she must bounce the apparatus high enough to draw more air into the air chamber 11. This is accomplished by a hard downward leaping exertion at the bottom of a stroke followed at the top of the same stroke by a deep knee bend with a simultaneous lifting motion on the foot strap(s) 25 and/or handhold(s) (not shown). This motion produces a partial vacuum in the air chamber 11, drawing more air into the air chamber 11 through adjustable intake check valve 5, resulting in an effectively longer air spring with a higher mean bouncing elevation. Several such actions can be performed in rapid succession by athletic persons, quickly producing a more challenging exercise as well as the maximum elevation or "topping out" of the equipment. Descent valve 9 can be pushed at any time to release air from the system, rapidly shortening the air spring and thus reducing the user's elevation, either all the way to the floor to disembark, or to continue the exercise as desired.

Serious or well-conditioned athletes may elect to employ the following, which is the crux of the preferred embodiment: The adjustable bleed valve 7 is opened to what is usually a predetermined setting, depending on the degree of intensity of exercise desired. The user then is required to repeat the above-described "ascending" exercise, or drawing in of air, repeatedly and with whatever higher degree of exertion may be needed to keep the equipment from "bottoming out" on the floor. Athletes and their coaches can soon determine what degree of air bleed, or opening of the bleed valve 7 is required to produce the desired intensity of timed exercise for a particular athlete, sport or occasion.

The operation of a second embodiment is the same as in the section immediately above, except that the exercise difficulty level is varied, not by controlling the release of air from the system, but by controlling how easily air is admitted into the system by intake check valve 5. Control of the ease of air intake can be achieved by varying either the intake flow rate, the cracking pressure of the check valve 5, or both, according to the following formula: The higher the ratio of cracking pressure to intake flow rate, the more difficult the ascent exercise. This could be expressed as D=P/F, where D is the rate of difficulty, or intensity of the exercise, P is the cracking pressure, and F is the flow rate of the valve when open. Once such a setting or a particular valve is selected, the user's ascent, or series of ascents can be timed with the user's objective of 'topping out', or taking the equipment up to its upper stops in the shortest possible time. After descending by actuating descent valve 9, such an exercise interval could be repeated as many times as desired. This alternate embodiment would also work well in combination with the Preferred Embodiment detailed above.

Peer-reviewed research has shown High Intensity Interval Training (HIIT) to be the most effective way to train for both aerobic and anaerobic cardiovascular fitness. The first such study to show this was published in *Medicine and Science in Sports and Exercise*, published by the American College of Sports Medicine in 1996 (pp. 1327-1330). Many sports require both types of fitness (anaerobic, as well as aerobic fitness), especially the many sports that require intermittent spurts of high-intensity effort. A short list of such sports would include football, basketball, soccer, ice hockey, field hockey, wrestling, boxing, and many sprinting sports both on the field and in the pool. One later mention of what has recently become accepted as the premier training protocol for such sports can be found in the concluding sentence in the Journal of Sports Sciences of March 2004 (p. 290), which states, "Consequently, short interval training may be recommended for physical preparation of field hockey players and participants in other field team sports of a high-intensity, intermittent nature where both aerobic and anaerobic capabilities are important." (emphasis added)

In order to achieve the above results, the athlete is taken to, or nearly to exhaustion, usually in intense intervals of less than one minute. This invention allows such exercise protocols to be safely performed and repeated with various degrees of precision, by controlling the ease of drawing air into the system as well as any outflow of air that may be desired or tolerated in order to increase the intensity of the exercise.

Thus the reader can see that this specification describes a practical and effective system that allows for a highly efficient cardiovascular exercise regimen for serious athletes, their coaches, and trainers. A needle-type metering valve has been chosen as the bleed valve means for the preferred embodiment because it provides a relatively inexpensive means to achieve precise repeatability in the amount of air being bled from the system. A fairly high degree of precision is helpful here for the comparisons that are necessary in judging improvement in the athlete's physical fitness, as well as an incentive for healthy competition, either among athletes, or for self-improvement.

There are several ways for enhancing the described invention. We have built and tested a version with a safety-belt, several automated safety controls and a timing display, in addition to an automated air-release system. That air-release system uses a series of three solenoid valves that allow seven precise levels of air release in addition to the default ("easy") level which leaves all three valves closed. The three solenoid valves are fitted with outlet orifices that are sized to produce a smooth progression of the outlet/bleed combinations. Though this arrangement is usable and safe, the feedback from users tells us that the automated controls can go much further to be more useful. One way is to program the display to hold and record the elapsed time on a given difficulty level. This allows a scoring system based on the time elapsed and the difficulty level. Scores can then be stored and utilized on a database. The amounts of air, either added or bled off can also figure into such a score. Also, a limit switch or proximity switch could activate bleeding when the upper range of motion nears the top of the stroke.

Additionally, any plural number of solenoid valves may be used if more (or less) combinations of air release are required. There are also other, possibly more efficient valve means for metering air flow, for instance, a motorized metering valve that may effectively perform the function of several, even many, solenoid valves.

Additionally, a type of valve, or flow control mechanism that has several differently sized orifices in a plate that can be rotationally, linearly, or otherwise manipulated so that the different orifices, or combinations of them could be brought into play for releasing different amounts of air.

Other types of valves that make repeatable valve openings possible to some degree of precision may be used. Also, a plurality of valves, even though they may each have only fully open and fully closed capability, could be opened in combination, manually or otherwise, with the effect of providing a plurality of settings for air release, much like the solenoid valves mentioned above.

In addition to valves with markings on them, valves with detents—with or without markings—can serve the same purpose of achieving repeatable air flow rates.

A form of flow control that has been called Pulse Width Modulation—varying the (air) flow using timed pulses—may also be used for controlling the flow of air either into or out of the system.

In retrospect, all of the above-described ways of controlling the release of air from the system may be used as means of controlling the ease of pumping air into the system by controlling the flow rate. This may be in addition to, or instead of varying the check valve cracking pressure by, for instance, changing the check valve's spring pressure. Also, controlling the flow of air into the air springs may be done without using any check valve at all, by timing a valve's opening near the top of the stroke, or whenever negative pressure is detected in the air spring(s). Nonetheless, the scope of the invention should not be limited to the embodiments described, but by the appended claims and their legal equivalents.

I claim:

1. A method of producing levels of cardiovascular exercise for serious athletic workouts, comprising the steps of:
   a. providing a stationary pneumatically elevating rebound exercise apparatus comprising an extendable air compression chamber and a valve system comprising at least one adjustable check valve for allowing a repeatable amount of ambient air into the air compression chamber when the air compression chamber is extended as a result of rebounding efforts by the user and at least one adjustable bleed valve for controllably releasing a repeatable degree of air bleed from said device and
   b. adjusting said valve system to predetermined air flow settings deemed appropriate for a particular user's exercise or exercise prescription.

2. The method of claim 1, further including the step of establishing an exercise protocol for the user.

3. The method of claim 1, including the step of having the user bounce on the apparatus with sufficient energy output to keep the apparatus from bottoming out which results from leakage of air volume such that a platform attached to the cylinders strikes the bottom of the machine and/or reduces the spring rate to a point that the user cannot generate a full range of motion in his or her lower extremities.

4. The method of claim 1, including the step of timing the maximum interval that the user is able to keep the exercise apparatus from bottoming out.

5. The method of claim 1, including the step of timing at least one ascent of the user between predetermined elevations on the exercise apparatus.

* * * * *